(12) United States Patent
Fiscella, Jr.

(10) Patent No.: US 7,582,205 B1
(45) Date of Patent: Sep. 1, 2009

(54) BRINE MIXING APPARATUS

(76) Inventor: Anthony S Fiscella, Jr., 5131 Kirkwood Dr., Las Vegas, NV (US) 89108

( * ) Notice: Subject to any disclaimer, the term of this patent is extended or adjusted under 35 U.S.C. 154(b) by 457 days.

(21) Appl. No.: 11/320,145

(22) Filed: Dec. 28, 2005

(51) Int. Cl.
*C02F 1/421* (2006.01)

(52) U.S. Cl. ............... 210/190; 210/198.1; 422/274; 422/281

(58) Field of Classification Search ........... 210/190, 210/191, 198.1; 137/268; 422/264, 274, 422/281, 261; 366/101; 261/77, 123
See application file for complete search history.

(56) References Cited

U.S. PATENT DOCUMENTS

| | | | |
|---|---|---|---|
| 3,385,674 A * | 5/1968 | Kolasinski | ............ 423/208 |
| 4,121,300 A | 10/1978 | Cosma et al. | |
| 4,722,797 A | 2/1988 | Gauer et al. | |
| 5,651,880 A | 7/1997 | Johnson | |
| 5,900,143 A | 5/1999 | Dalton et al. | |
| 5,948,220 A | 9/1999 | Kamitani et al. | |
| 6,379,630 B1 | 4/2002 | Wilfong et al. | |
| 6,926,835 B2 * | 8/2005 | Iizuka et al. | ............ 210/662 |
| 2002/0030004 A1 * | 3/2002 | Hammonds | ............ 210/198.1 |

FOREIGN PATENT DOCUMENTS

| | | |
|---|---|---|
| CA | 2.375.789 | 9/2003 |
| FR | 2702763 | 9/1994 |
| GB | 890.285 | 2/1962 |
| JP | 6288812 | 10/1994 |
| WO | WO9612556 | 5/1996 |
| WO | WO0224318 | 3/2002 |

\* cited by examiner

*Primary Examiner*—Matthew O Savage
(74) *Attorney, Agent, or Firm*—Michael I Kroll

(57) ABSTRACT

An apparatus for use with a water softening system including an outer bucket, an inner container having a first end, and a plug, where the plug is received within the first end of the inner container for supporting the inner container and allowing brine to be retained within the inner container. A plurality of apertures extend around a periphery of the plug for providing access between the inner container and the outer bucket. An agitator is positioned within the plug for agitating water retained within the outer bucket. The agitation of the water in the outer bucket causes the water to flow through the plurality of recesses to contact the brine forming a mixture able to improve the operation of the water softening system.

13 Claims, 14 Drawing Sheets

BRINE MIXING APPARATUS

BACKGROUND OF THE INVENTION

1. Field of the Invention

The present invention relates generally to receptacles and, more specifically, to an insert for suspending a quantity of soluble material within a tank whereby the soluble material passes into solution with the fluid in the tank. The insert is a brine mixing apparatus positionable within a water tank for the purposes of creating a regenerant solution used in water softening system. The receptacle can selectively vary in height to keep most of the soluble material dry until needed. Air from an air source agitates the water, accelerating the passing of the soluble material into solution with the tank water.

2. Description of the Prior Art

There are other receptacle device designed for mixing. Typical of these is U.S. Pat. No. 4,121,300 issued to Cosma, et al. on Oct. 17, 1978.

Another patent was issued to Gauer, et al. on Feb. 2, 1988 as U.S. Pat. No. 4,722,797. Yet another U.S. Pat. No. 5,651,880 was issued to Johnson on Jul. 29, 1997 and still yet another was issued on May 4, 1999 to Dalton, et al. as U.S. Pat. No. 5,900,143.

Another patent was issued to Kamitani, et al. on Sep. 7, 1999 as U.S. Pat. No. 5,948,220. Yet another U.S. Pat. No. 6,379,630 was issued to Wilfong, et al. on Apr. 30, 2002. Another was issued to Zwicky on Feb. 28, 1962 as U.K. Patent No. GB890,285 and still yet another was issued on Sep. 23, 1994 to Bontemps, et al. as French Patent No. FR2702763.

Another patent was issued to Kenichiro on Oct. 18, 1994 as Japanese Patent No. JP6288812. Yet another International Patent Application No. WO96/12556 was issued to Hammonds on May 2, 1996. Another was issued to Wetherington on Mar. 28, 2002 as International Patent Application No. WO02/24318 and still yet another was issued on Sep. 11, 2003 to Vautour as Canadian Patent No. CA2375789.

U.S. Pat. No. 4,121,300

Inventor: Earl Jesse Cosma

Issued: Oct. 17, 1978

A system for treating dry protein material in brine solutions comprises a tank for receiving the protein material and brine solution a container having a screened bottom end an agitator inserted through its open upper end for creating a vortex mixing action in the brine solution in which the container is immersed in the brine holding tank.

U.S. Pat. No. 4,722,797

Inventor: Gary W. Gauer

Issued: Feb. 2, 1988

A method and apparatus for selecting the quantity of salt to be used during each regeneration of a water softener system. The quantity of salt used during each regeneration is approximately equal to the quantity of salt needed to regenerate the resin bed to a preselected design capacity, which is less than the maximum capacity of the resin bed. The design exchange capacity is approximately equal to the exchange capacity of the resin bed at a particular salt dosage, wherein the exchange capacity of the bed at the particular salt dosage divided by the particular salt dosage is generally equal to or greater than 2850. The system is regenerated when at the end of any preselected time period, the percentage of the design capacity of the resin bed used since the last regeneration cycle exceeds a predetermined percentage. In determining the salt dosage used during each regeneration cycle, the exchange capacity of the resin bed is determined for various salt dosages. The available exchange capacity of the resin bed is determined by subtracting the exchange capacity of the resin bed used since the last regeneration from the selected design capacity of the resin bed. The salt dosage used during each regeneration is approximately equal to the salt dosage of the resin bed at the design exchange capacity less the salt dosage of the resin bed at the available exchange capacity of the resin bed. The apparatus of the present invention utilizes a micro-computer to automatically make the necessary calculations to determine when to regenerate the resin bed and to determined the proper salt dosage fill time to the brine tank prior to each regeneration. A turbine water meter located in the soft water outlet line measures the water usage since the last regeneration.

U.S. Pat. No. 5,651,880

Inventor: Stanley O. Johnson

Issued: Jul. 29, 1997

A salt dispenser for placement within a water softener brine tank has a cylindrical, rectangular or square plastic sleeve with multiple holes which allow the passage of water while retaining salt pellets. The salt dispenser is particularly advantageous for brine tanks which do not support the salt pellets or crystals above the bottom of the tank. The salt dispenser allows water to access the salt within the brine tank from all sides which leads to an even reduction in the height of the salt bed within the salt dispenser. Many water softener systems are supplied with brine tanks in which the salt rests directly on the bottom of the brine tank. Water is supplied to the brine tank by a float valve which also functions to allow brine to be withdrawn from the tank. After brine is withdrawn the float valve permits water to be added until a predetermined water level is reached. The introduction of water into the brine tank causes some of the salt pellet crystals to dissolve. Water is introduced from a single point the salt within the brine tank and the salt pellets can become steeply sloped towards the water inlet. The salt dispenser allows the water to access the salt within the brine tank from all sides and thereby leads to an even reduction in the height of the salt bed within the salt dispenser. The interior of the salt dispenser tank also may be divided by partitions or concentric sleeves.

U.S. Pat. No. 5,900,143

Inventor: Keith Raymond Dalton

Issued: May 4, 1999

A portable container (2) for purifying drinking water (4), which container (2) comprises a body portion (6) for containing the drinking water (4), a handle (8) for lifting the container (2) for water pouring and water re-filling purposes, an ozone generator (10) for generating ozone from air, an air pump (12) for delivering air to the ozone generator (10) in order to produce a mixture of air and ozone and for delivering the mixture of air and ozone to the drinking water (4) in the body portion (6), and a filter (14) for the drinking water (4), and the container (2) being such that the mixture of air and ozone delivered to the drinking water (4) in the body portion (6) causes the drinking water (4) and the mixture of air and ozone continuously to pass through the filter (14) whereby the filter (14) filters the drinking water (4), and the ozone purifies both the water and the filter means (14).

U.S. Pat. No. 5,948,220

Inventor: Yoshinori Kamitani, et al.

Issued: Sep. 7, 1999

A production system of electrolyzed water of the type which includes a first brine tank arranged to store an amount of saturated brine, a second brine tank arranged to be supplied with the saturated brine from the first brine tank through an electrically operated pinch valve and fresh water from an external source of water through an electrically operated water supply valve for storing an amount of diluted brine, and an electrolyzer arranged to electrolyze the diluted brine supplied from the second brine tank for production of electrolyzed water. In the production system, there are provided a conductivity sensor for detecting conductivity of the diluted brine in the second brine tank, an ammeter for detecting a direct current applied to the electrolyzer, and an electric controller adapted to control the pinch valve in such a manner that the second brine tank is supplied with the saturated brine from the first brine tank when the conductivity of the diluted brine detected by the sensor becomes lower than a reference value and to correct the reference value in accordance with the direct current detected by the ammeter.

U.S. Pat. No. 6,379,630

Inventor: Rudy B. Wilfong, et al.

Issued: Apr. 30, 2002

A salt grid for supporting salt above a portion of a concentrated brine solution in a brine tank for use in a water softening system. The grid comprises first and second platforms disposed at first and second elevational levels with respect to the vertical wall of the brine tank. The fluid level in the brine tank can be adjusted to be higher than the lower platform of the salt grid but lower than the upper platform of the salt grid. In this manner, salt dissolves only above the lower platform part of the grid and consequently, the dirt included in the salt only passes through the lower platform of the grid. The brine well which transports brine solution from the brine tank to the resin tank is located away from the localized area in which the dirt collects at the bottom of the brine tank. Leg extension members may be attached to the supporting legs of the salt grid to further raise the salt grid above the bottom of the brine tank, thereby increasing the volume of brine solution which forms below the salt grid.

U.K. Patent Number GB890,285

Inventor: John Frederick Zwicky

Issued: Feb. 28, 1962

An apparatus for ensuring uniformity in mixtures of caustic soda solution or acid in water comprises a Venturi pump 4 to which de-ionized water is supplied through a pipe 1 to a storage tank 5. The secondary liquid is lifted from the vessel 2 through a pipe 3. The amount of water supplied may be adjusted by a valve 6. A tube 8 of microporous material extends across the bottom of the tank 5; there is a valve 7 adapted to put the pipe 3 into communication with both or either the tube 8 and for the vessel 2, so that the solution in tank 5 may be recirculated with or without the addition of additive as well as water. The additive may for example be regenerant caustic soda solution for resin-ion exchange water-deionizing apparatus, or concentrated acid. Solid caustic soda to be dissolved may be placed in a basket 9 at the Venturi outlet.

French Patent Number FR2702763

Inventor: Jean-Claude Bontemps, et al.

Issued: Sep. 23, 1994

Water softening plant including: at least one storage container for cation exchange resin, at least one storage container for stocking salt and for preparing brine, connecting means for joining these storage containers to each other, to an inlet for water to be treated and to an outlet for treated water, switching means for selectively establishing communications between the means of coupling, and programming means arranged for controlling the said switching means, characterised in that the storage container for stocking salt and for preparing brine (4) is made in the form of a movable drawer arranged to be capable of being moved away from the remainder (1) of the plant with a view to being filled with salt and to being reintegrated into the remainder of the plant once this filling has been performed and in that flexible connections (6) are provided between the said storage container and the remainder of the plant with a view to allowing the movement of the said storage container produced in the form of a drawer.

Japanese Patent Number JP6288812

Inventor: Takematsu Kenichiro, et al.

Issued: Oct. 18, 1994

PURPOSE: To provide a device for detecting the level of salt water in a salt water tank and the concentration of salt water whereby a prescribed quantity of salt water having a prescribed concentration of salt water is reserved in a tank of a water softener and an ion exchange resin is surely recycled. CONSTITUTION: In a salt water tank 4 communicating with a resin cylinder 2 filled with an ion exchange resin 1 via a control valve 3 and a salt water line 6, a pressure sensor 10 that detects the quantity (level) of a salt water required for recycling the ion exchange resin 1 and the concentration of salt water is provided on a bottom section thereof. The pressure sensor 10 and a control device 12 are connected to each other via a signal line 11 and the control device 12 and a control valve 3 are connected to each other via a signal line 11'.

International Patent Application Number WO96/12556

Inventor: Carl L. Hammonds

Issued: May 2, 1996

An apparatus and method for injecting dry particulate material into a fluid flow line including a removable material supply unit (18) having an outer rigid container (55) and a sealed flexible bag (54) for the dry particulate material. The removable material supply unit (18) is mounted on a container support (13) above a mixing chamber (12) with a valve member (40) controlling the flow or dispensing of the dry particulate material into the mixing chamber (12). A pump (32) when energized exerts a vacuum in the mixing chamber (12). Water enters the mixing chamber (12) from an elliptical discharge opening (10) tangential to mixing chamber (12) to provide a vortex. Pump (32) exerts a vacuum within the mixing chamber (12) above the level of the water so that any upward migration of moisture from the water in the mixing chamber (12) is prevented by the vacuum when pump (30) is energized.

International Patent Application Number
WO02/24318

Inventor: William S. Wetherington

Issued: Mar. 28, 2002

An apparatus and method for mixing a dry chemical contained within a container. A probe (100) is utilized to puncture an opening in the container (16) and thereafter the probe is extended through the opening. A mixture or liquid is directed to and through the probe and, as the liquid or mixture exits the probe, the dry chemical is dissolved and mixed with the liquid or mixture. Thereafter, the resulting mixture gravitates downwardly through the opening in the container to an underlying tank (16). Associated with the tank is a concentration controller (80) that is operatively connected to a pump (90) that pumps the mixture from the tank to and through the probe. Effectively, the concentration controller periodically activates the pump to maintain the concentration level of the mixture in the tank within a pre-selected range.

Canadian Patent Number CA2375789

Inventor: David Vautour

Issued: Sep. 11, 2003

The invention is a hopper having a valve controlled water inlet for varying the water flow and therefore the concentration of a brine mix. The hopper has a base positioned catch basin for collecting the brine solution as it flows out the overflow drains.

SUMMARY OF THE PRESENT INVENTION

The present invention relates generally to receptacles and, more specifically, to an insert for suspending a quantity of soluble material within a tank whereby the soluble material passes into solution with the fluid in the tank. The insert is a brine mixing apparatus positionable within a water tank for the purposes of creating a regenerant solution used in water softening system. The receptacle can selectively vary in height to keep most of the soluble material dry until needed. Air from an air source agitates the water, accelerating the passing of the soluble material into solution with the tank water.

A primary object of the present invention is to provide a brine tank insert that overcomes the shortcomings of the prior art.

Another secondary object of the present invention is to provide a brine tank insert that may be incorporated into new and existing brine tanks, or all-in-one water softener systems.

Another object of the present invention is to provide a brine tank insert that provides a device for circulating the water within the brine tank.

Yet another object of the present invention is to provide a brine tank insert that provides a device to keep the brine dry until needed.

Still yet another object of the present invention is to provide a brine tank insert that can whose height can be adjusted to accommodate different size tanks.

Another object of the present invention is to provide a brine tank insert having apertures positioned at the bottom of the brine tank and having a press fitting to accommodate and secure the aerator in its respective position.

Yet another object of the present invention is to provide a brine tank insert having an aerator that is press fitted into the bottom portion of the tank that is connected to an air pump via air tube.

Still another object of the present invention is to provide a brine tank insert wherein the aerator provides an air supply to circulate the water.

Another object of the present invention is to provide a brine tank insert wherein circulation of the water more efficiently cleans the resin beads.

Still yet another object of the present invention is to provide a brine tank insert that is simple and easy to use.

Another object of the present invention is to provide a brine tank insert that is inexpensive to manufacture and operate.

Additional objects of the present invention will appear as the description proceeds.

The foregoing and other objects and advantages will appear from the description to follow. In the description reference is made to the accompanying drawings, which forms a part hereof, and in which is shown by way of illustration-specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
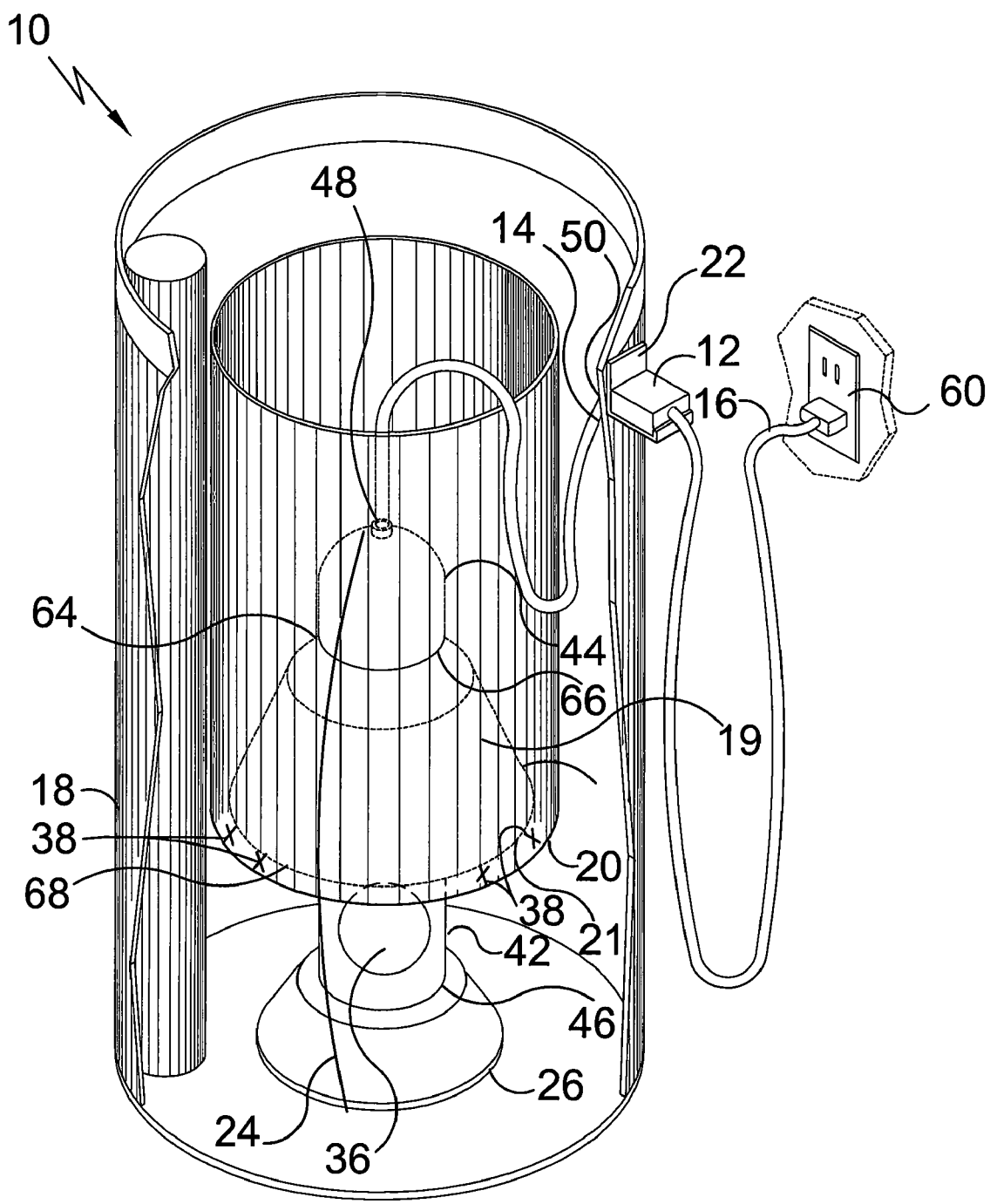
FIG. 1 is a perspective view of the brine tank insert of the present invention.

Turning now descriptively to the drawings, in which similar reference characters denote similar elements throughout the several views, the Figures illustrate the brine tank insert of the present invention. With regard to the reference numerals used, the following numbering is used throughout the various drawing Figures.

| | |
|---|---|
| 10 | Brine tank insert of the present invention |
| 12 | pump |
| 14 | pump air hose |
| 16 | pump electrical cord |
| 18 | outer bucket |
| 19 | plug |
| 20 | inner cylinder |
| 21 | first end of inner cylinder |
| 22 | pump bracket |
| 24 | aerator |
| 26 | base |
| 28 | threads |
| 30 | water |
| 32 | brine |
| 34 | air flow directional arrows |
| 36 | transverse throughbore |
| 38 | base positioned aperture |
| 40 | bell aperture |
| 42 | stanchion |
| 44 | stanchion top |
| 46 | stanchion bottom |
| 48 | first end air hose |
| 50 | second end air hose |
| 52 | first end electrical cord |
| 54 | second end electrical cord |
| 56 | first end of pump |
| 58 | second end of pump |
| 60 | outlet |
| 64 | plug aperture |
| 66 | plug top |
| 68 | plug bottom |
| 70 | aperture threads |

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 14 illustrate a brine tank insert of the present invention which is indicated generally by the reference numeral 10.

Figure 3:
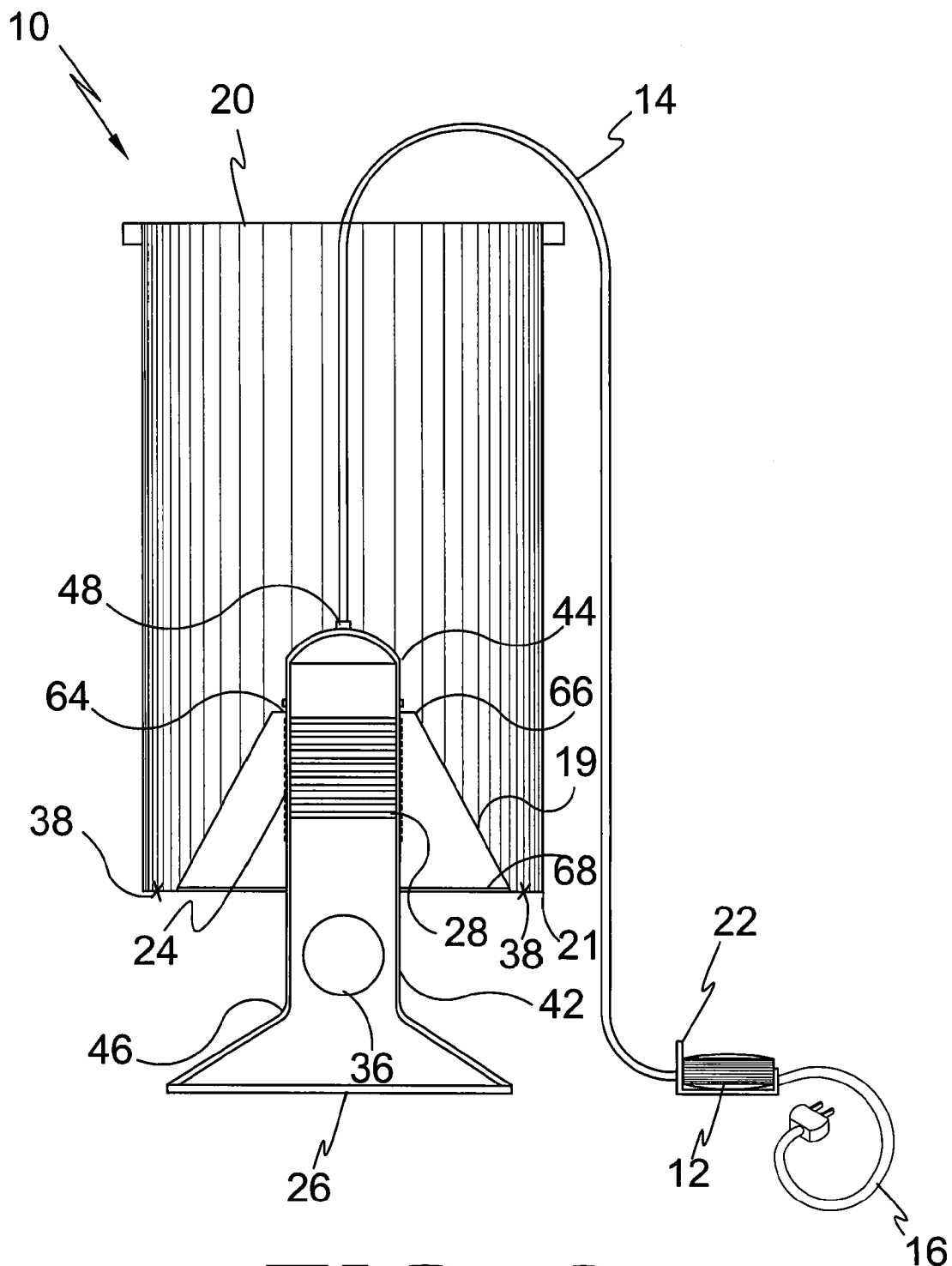
FIG. 3 is a perspective view of the brine tank insert of the present invention.

FIG. 1 is a perspective cutaway view of the brine tank insert 10 of the present invention. The brine tank insert 10 includes an outer bucket 18 for retaining fluid therein. An inner cylinder or container 20 having a central recess is received within the outer bucket 18. The shape of both the inner cylinder 20 and the outer bucket 18 are described for purposes of example only and the bucket and cylinder 18, 20 may be formed in any geometric shape. A first end 21 of the inner cylinder 20 receives a plug 19, thereby forming a cavity for retaining brine 32, as shown hereinafter with specific reference to FIG. 14. The brine tank insert 10 also includes an aerator 24 for aerating the fluid in the outer bucket 18. The aerator 24 is comprised of a base 26 and a stanchion 42. The base 26 permits the aerator 24 to be press fitted into a base of the outer bucket 18. The stanchion 42 includes a top 44 and a bottom 46. The bottom 46 of the stanchion 42 is attached to the base 26. A transverse throughbore 36 is located at the bottom 46 of the stanchion 42 proximate to the base 26. A plurality of threads 28, shown in FIG. 3, are located along the perimeter of the stanchion 42 proximate to the top 44 of the stanchion 42. The plug 19 is rotatively secured to the stanchion 42 via the threads 28. Herein, the plug is bell shaped. However, this is for purposes of example only, and the plug 19 can be of any geometric shape that provides for the easy shuffling of the brine 32 and to keep a majority of the brine 32 dry until needed. The plug 19 has a top 66 and a bottom 68. A plug aperture 64 is centrally disposed within the plug 19, and runs from the top 66 to the bottom 68 of the plug 19. The plug aperture 64 contains a plurality of aperture threads 70, not shown. Each respective aperture thread 70 corresponds to each respective thread 28, enabling the plug 19 to be rotatively secured to the stanchion 42. The aperture threads 70 and the threads 28 also permit the height at which the plug 19 is placed along the stanchion 42 to be varied. The outer walls of the plug 19 contain a plurality of bell apertures 40 therein for providing air circulation, shown in FIG. 14. A perimeter of the plug 19 has a plurality of base positioned apertures 38 (each aperture is represented by an "X") therearound, shown hereinafter with specific reference to FIGS. 1, 3, 4, and 14.

The top 44 of the stanchion 42 is connected to a first end 48 of an air hose 14. A second end 50 of the air hose 14 is connected to a pump 12. The pump 12 is electrically powered and is connected to an outlet 60 by an electrical cord 16. The pump 12 is attached to the outside of the outer bucket 18 by a pump bracket 22. However, the pump bracket 22 is for purposes of example only and any support device can be used to support the pump 12 at any location where pump 12 functionality is maintained.

The outer bucket 18 has an upper open end, a closed lower end, and is filled with water to a desired level. The inner cylinder or container 20 is filled with brine 32, shown in FIG. 14. The plug 19 is adjusted on the stanchion 42 to a desired height and fitted into the inner cylinder 20. The inner cylinder 20, plug 19 and stanchion 42 are placed within the outer bucket 18. The water flows from the outer bucket 18 into the inner cylinder 20 via the plurality of base positioned apertures 38. The water fills the inner cylinder 20 from the base up to the water level in the outer bucket 18, thereby submerging the brine 32 at the base of the outer bucket 18. The pump 12 pumps air through the air hose 14, The air then flows through the stanchion 42 and exits the stanchion 42 through the transverse throughbore 36. The air then agitates the water causing the water to be circulated. Some of the air also flows back into the plug 19 where it flows through the bell apertures 40 for loosening and rinsing the brine 32. The submerged brine 32 will continually dissolve until the saturation and desired brine solution levels are achieved. The brine tank insert 10 also keeps the brine 32 within the inner cylinder 20 and not submerged in the fluid while the submerged brine 32 evenly dissolves.

Figure 2:
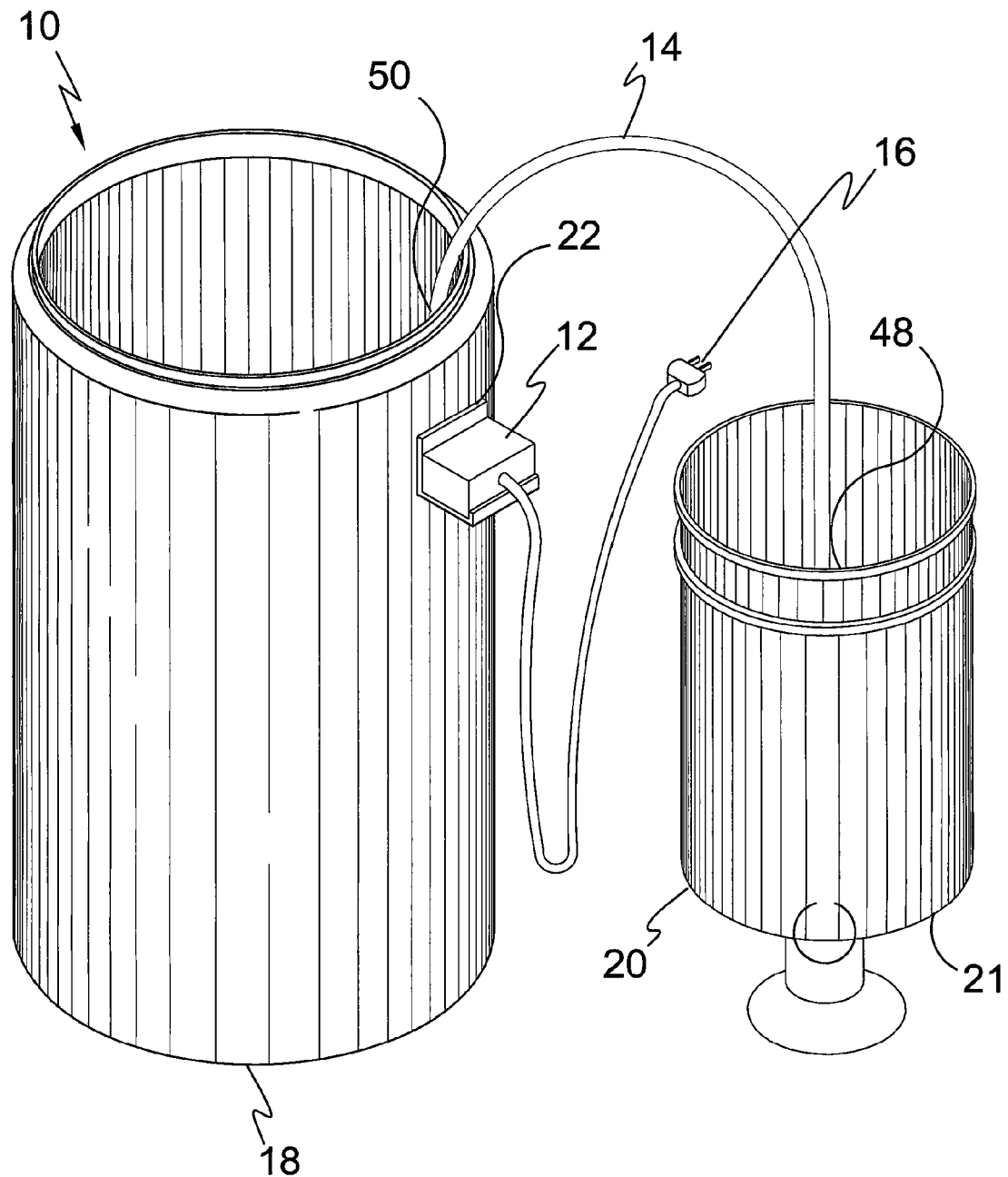
FIG. 2 is a perspective view of the brine tank insert of the present invention.

FIG. 2 is a perspective view of the brine tank insert 10 of the present invention. The brine tank insert 10 includes the outer bucket 18 for retaining fluid therein. The inner cylinder 20 having a central recess is received within the outer bucket 18. The first end 21 of the inner cylinder 20 receives a plug 19, thereby forming a cavity for retaining brine 32, as shown hereinafter with specific reference to FIG. 14. The brine tank insert 10 also includes the aerator 24 for aerating the fluid in the outer bucket 18. The aerator 24 is comprised of the base 26 and the stanchion 42. The base 26 permits the aerator 24 to be press fitted into the base of the outer bucket 18. The stanchion 42 includes the top 44 and the bottom 46. The bottom 46 of the stanchion 42 is attached to the base 26. The transverse throughbore 36 is located at the bottom 46 of the stanchion 42 proximate to the base 26. The plug 19 is rotatively secured to the stanchion 42 via the threads 28. The height of the plug 19 can be adjusted along the stanchion's 42 length, between the top 44 and bottom 46 thereof.

The top 44 of the stanchion 42 is connected to the first end 48 of the air hose 14. The second end 50 of the air hose 14 is connected to the pump 12. The pump 12 is electrically powered and is connected to the outlet 60, shown in FIG. 1, by an electrical cord 16. The pump 12 is attached to the outside of the outer bucket 18 by the pump bracket 22. However, the pump bracket 22 is for purposes of example only and any support device can be used to support the pump 12 at any location where pump 12 functionality is maintained.

FIG. 3 is a cutaway perspective view of the brine tank insert 10 of the present invention. The brine tank insert 10 includes the outer bucket 18 for retaining fluid therein. The inner cylinder 20 having a central recess is received within the outer bucket 18. The first end 21 of the inner cylinder 20 receives a plug 19, thereby forming a cavity for retaining brine 32, as shown hereinafter with specific reference to FIG. 14. The brine tank insert 10 also includes the aerator 24 for aerating the fluid in the outer bucket 18. The aerator 24 is comprised of the base 26 and the stanchion 42, The base 26 permits the aerator 24 to be press fitted into the base of the outer bucket 18. The stanchion 42 has the top 44 and the bottom 46. The bottom 46 of the stanchion 42 is attached to the base 26. The transverse throughbore 36 is located at the bottom 46 of the stanchion 42 proximate to the base 26. The threads 28 are located along the perimeter of the stanchion 42 proximate to the top 44 of the stanchion 42. The plug 19 is rotatively secured to the stanchion 42 via the threads 28. Herein, the plug 19 is bell shaped. However, this is for purposes of example only, and the plug 19 can be of any geometric shape that provides for the easy shuffling of the brine 32 and to keep a majority of the brine 32 dry until needed. The plug 19 has the top 66 and the bottom 68. The plug aperture 64 is centrally disposed within the plug 19, and runs from the top 66 to the bottom 68 of the plug 19. The plug aperture 64 contains the aperture threads 70. Each respective aperture thread 70 corresponds to each respective thread 28 enabling the plug 19 to be rotatively secured to the stanchion 42. The aperture threads 70 and the threads 28 also permit the height at which the plug 19 is placed along the stanchion 42 to be varied. The outer walls of the plug 19 contain the plurality of bell apertures 40 therein for providing air circulation, shown in FIG. 14. A perimeter of the plug 19 has a plurality of base positioned apertures 38 therearound, shown hereinafter with specific reference to FIG. 14.

The top 44 of the stanchion 42 is connected to the first end 48 of the air hose 14. The second end 50 of the air hose 14 is connected to the pump 12. The pump 12 is electrically powered and is connected to the outlet 60, shown in FIG. 1, by an electrical cord 16. The pump 12 is attached to the outside of the outer bucket 18 by the pump bracket 22. However, the pump bracket 22 is for purposes of example only and any support device can be used to support the pump 12 at any location where pump 12 functionality is maintained.

Figure 4:
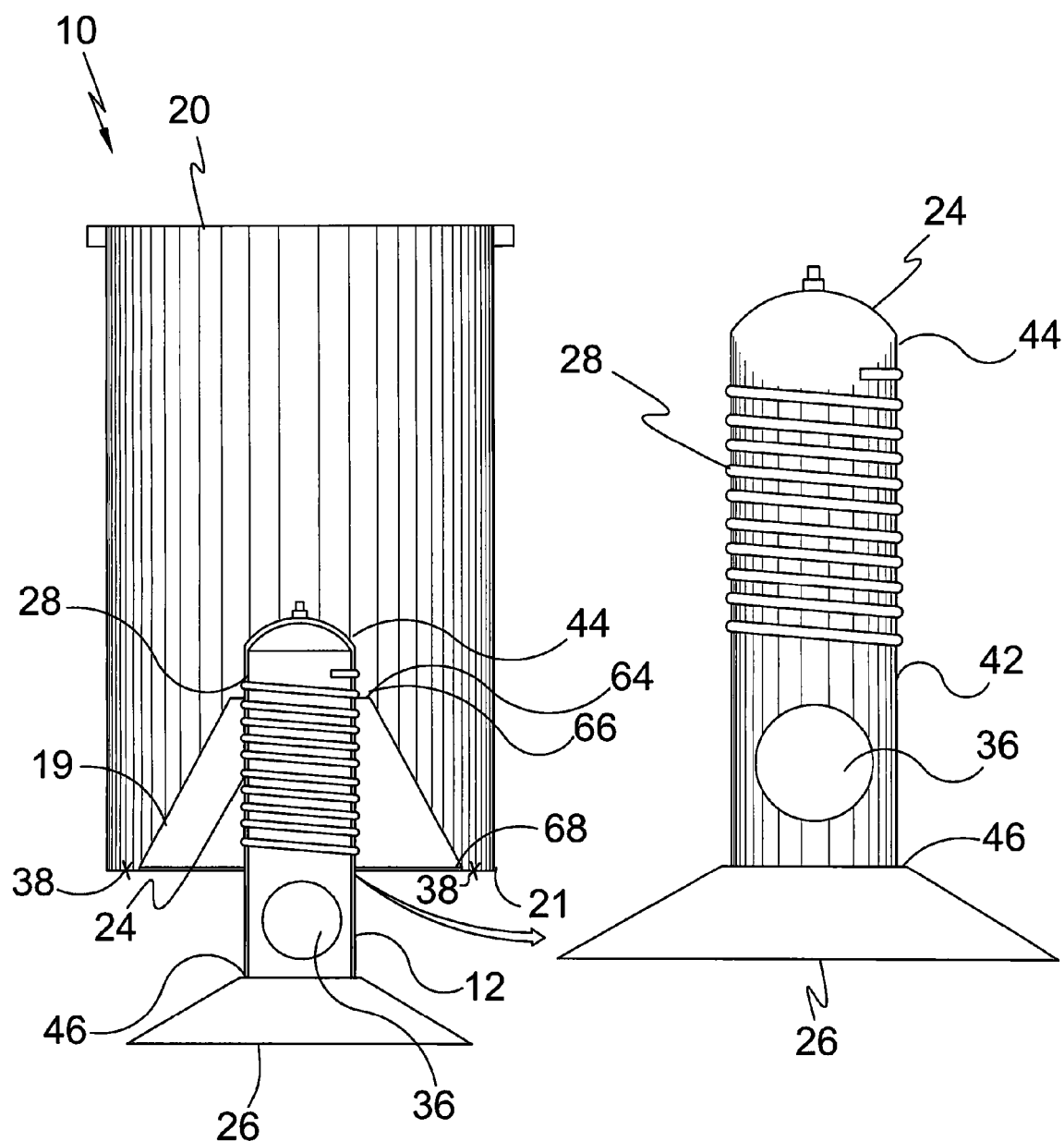
FIG. 4 is a cutaway perspective view of the brine tank insert of the present invention.

FIG. 4 is a cut-away perspective view of the brine tank insert 10 of the present invention. The brine tank insert 10 includes the outer bucket 18 for retaining fluid therein. The inner cylinder 20 having a central recess is received within the outer bucket 18, shown in FIG. 2. The first end 21 of the inner cylinder 20 receives a plug 19, thereby forming a cavity for retaining brine 32, as shown hereinafter with specific reference to FIG. 14. The brine tank insert 10 also includes the aerator 24 for aerating the fluid in the outer bucket 18. The aerator 24 is comprised of the base 26 and the stanchion 42. The base 26 permits the aerator 24 to be press fitted into the base of the outer bucket 18. The stanchion 42 has the top 44 and the bottom 46. The bottom 46 of the stanchion 42 is attached to the base 26. The transverse throughbore 36 is located at the bottom 46 of the stanchion 42 proximate to the base 26. The threads 28 are located along the perimeter of the stanchion 42 proximate to the top 44 of the stanchion 42. The plug 19 is rotatively secured to the stanchion 42 via the threads 28. Herein, the plug 19 is bell shaped. However, this is for purposes of example only, and the plug 19 can be of any geometric shape that provides for the easy shuffling of the brine 32 and to keep a majority of the brine 32 dry until needed. The plug 19 has the top 66 and the bottom 68. The plug aperture 64 is centrally disposed within the plug 19, and runs from the top 66 to the bottom 68 of the plug 19. The plug aperture 64 contains the aperture threads 70, not shown. Each respective aperture thread 70 corresponds to each respective thread 28 enabling the plug 19 to be rotatively secured to the stanchion 42. The aperture threads 70 and the threads 28 also permit the height at which the plug 19 is placed along the stanchion 42 to be varied. The outer walls of the plug 19 contain the plurality of bell apertures 40 therein for providing air circulation, shown in FIG. 14. A perimeter of the plug 19 has a plurality of base positioned apertures 38 therearound, shown hereinafter with specific reference to FIG. 14.

Figure 5:
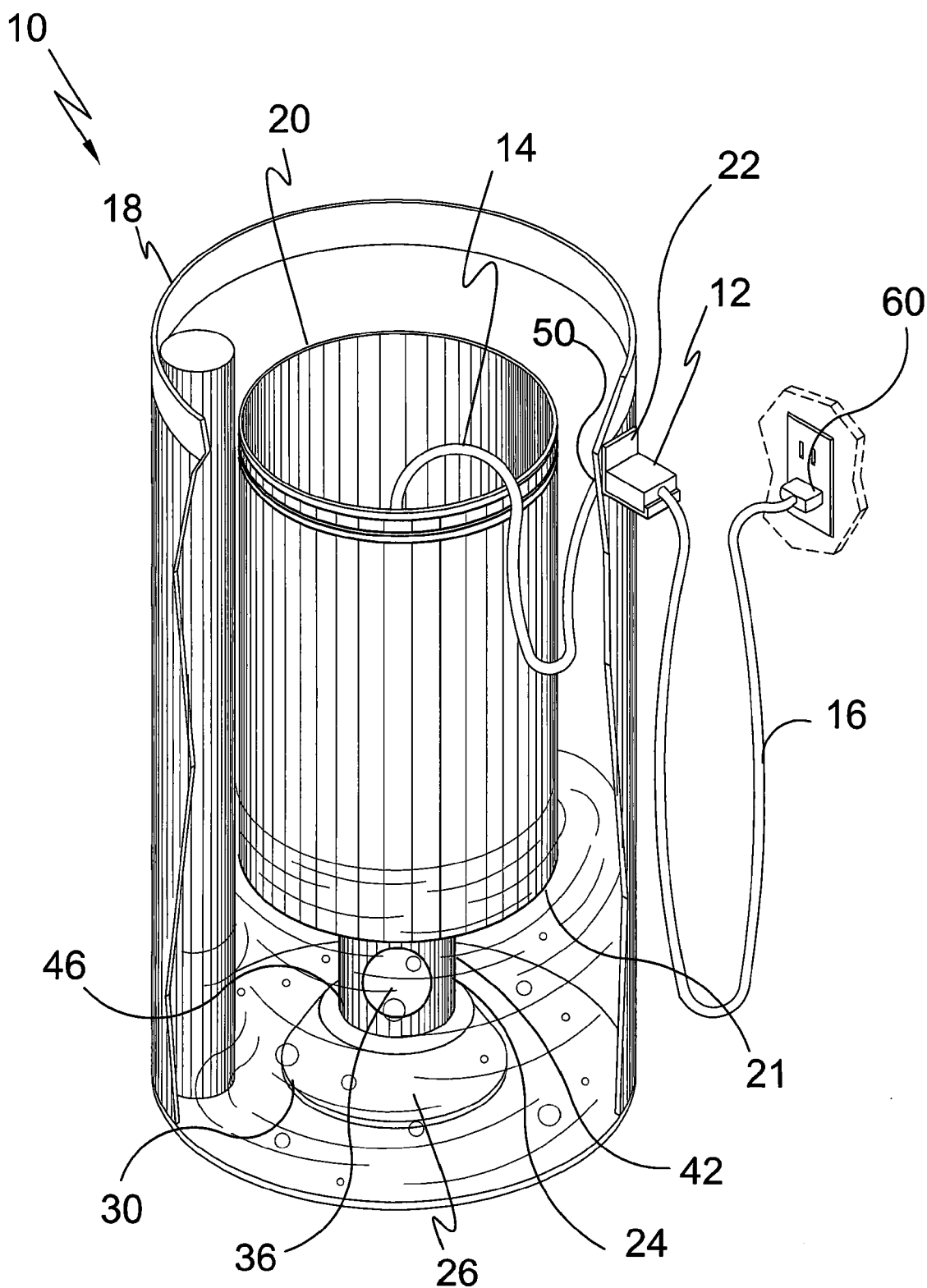
FIG. 5 is a sectional illustrative view of the brine tank insert of the present invention.

FIG. 5 is a sectional illustrative view of the brine tank insert 10 of the present invention. The brine tank insert 10 includes the outer bucket 18 for retaining fluid therein. The inner cylinder 20 having a central recess is received within the outer bucket 18, shown in FIG. 2. The first end 21 of the inner cylinder 20 receives a plug 19, thereby forming a cavity for retaining brine 32, as shown hereinafter with specific reference to FIG. 14. The brine tank insert 10 also includes the aerator 24 for aerating the fluid in the outer bucket 18. The aerator 24 is comprised of the base 26 and the stanchion 42. The base 26 permits the aerator 24 to be press fitted into the base of the outer bucket 18. The stanchion 42 includes the top 44 and the bottom 46. The bottom 46 of the stanchion 42 is attached to the base 26. The transverse throughbore 36 is located at the bottom 46 of the stanchion 42 proximate to the base 26. The plug 19, shown in FIG. 1, is rotatively secured to the stanchion 42 via threads 28. The height at which the plug 19 is placed along the stanchion 42 is variable. The outer walls of the plug 19 contain the plurality of bell apertures 40 therein for providing air circulation, shown in FIG. 14. A perimeter of the plug 19 has a plurality of base positioned apertures 38 therearound, shown hereinafter with specific reference to FIG. 14.

The top 44 of the stanchion 42 is connected to the first end 48 of the air hose 14. The second end 50 of the air hose 14 is connected to the pump 12. The pump 12 is electrically powered and is connected to the outlet 60, shown in FIG. 1, by an electrical cord 16. The pump 12 is attached to the outside of the outer bucket 18 by the pump bracket 22. However, the pump bracket 22 is for purposes of example only and any support device can be used to support the pump 12 at any location where pump 12 functionality is maintained.

The outer bucket 18 is filled with water to a desired level. The inner cylinder 20 is filled with brine 32, shown in FIG. 14. The plug 19 is adjusted on the stanchion 42 to a desired height and fitted into the inner cylinder 20, The inner cylinder 20, plug 19 and stanchion 42 are placed within the outer bucket 18. The water flows from the outer bucket 18 into the inner cylinder 20 via the plurality of base positioned apertures 38. The water fills the inner cylinder 20 from the base up to the water level in the outer bucket 18, thereby submerging the brine 32 at the base of the outer bucket 18. The pump 12 pumps air through the air hose 14. The air then flows through the stanchion 42 and exits the stanchion 42 through the transverse throughbore 36. The air then agitates the water causing the water to be circulated. Some of the air also flows back into the plug 19 where it flows through the bell apertures 40 for loosening and rinsing the brine 32. The submerged brine 32 will continually dissolve until the saturation and desired brine solution levels are achieved. The brine tank insert 10 also keeps the brine 32 within the inner cylinder 20 and not submerged in the fluid while the submerged brine 32 evenly dissolves.

Figure 6:
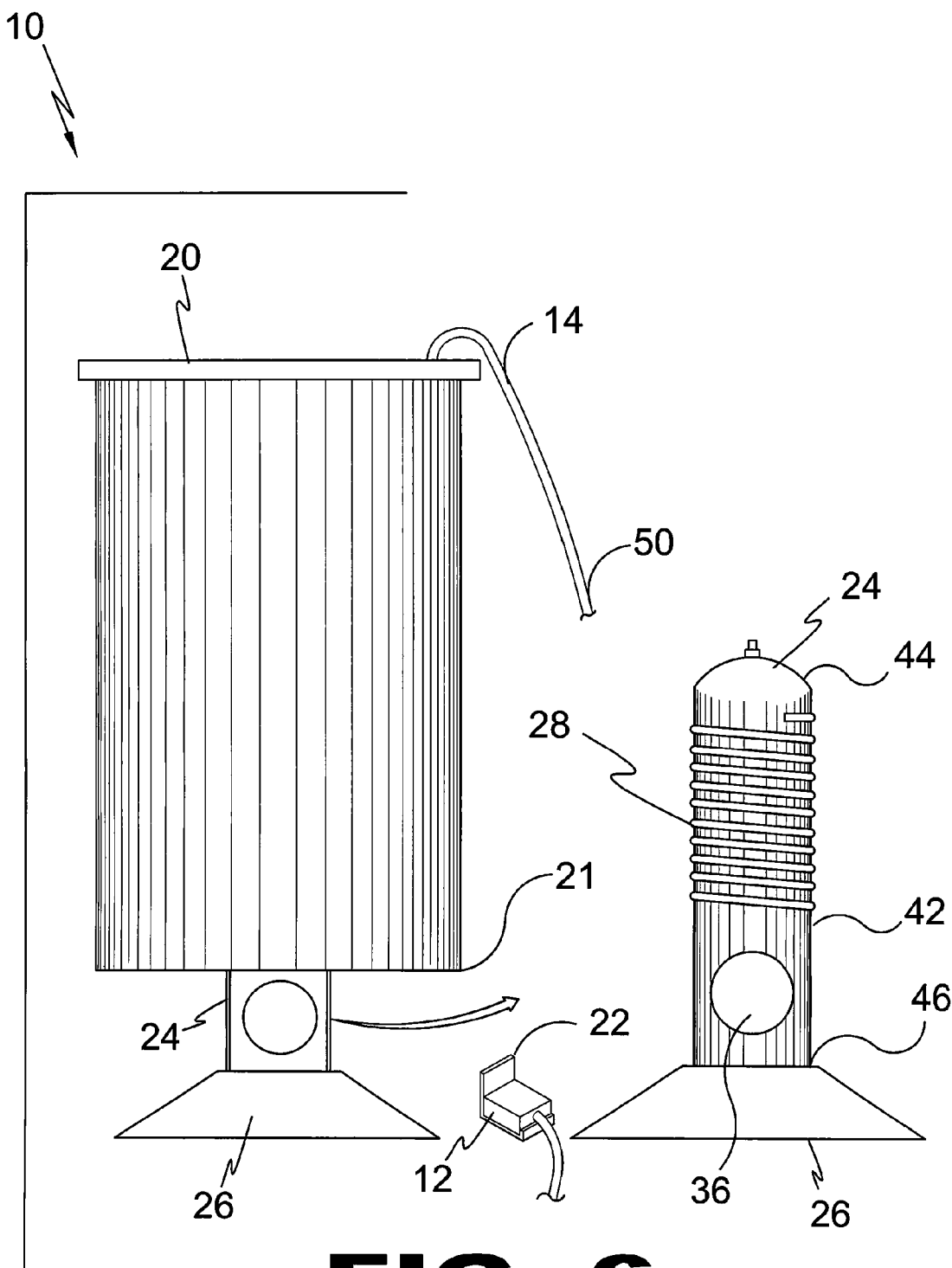
FIG. 6 is a perspective view of the brine tank insert of the present invention.

FIG. 6 is a perspective view of the brine tank insert 10 of the present invention. The brine tank insert 10 includes the outer bucket 18 for retaining fluid therein. The inner cylinder 20 having a central recess is received within the outer bucket 18, shown in FIG. 2. The first end 21 of the inner cylinder 20 receives a plug 19, thereby forming a cavity for retaining brine 32, as shown hereinafter with specific reference to FIG. 14. The brine tank insert 10 also includes the aerator 24 for aerating the fluid in the outer bucket 18. The aerator 24 is comprised of the base 26 and the stanchion 42. The base 26 permits the aerator 24 to be press fitted into the base of the outer bucket 18. The stanchion 42 has the top 44 and the bottom 46. The bottom 46 of the stanchion 42 is attached to the base 26. The transverse throughbore 36 is located at the bottom 46 of the stanchion 42 proximate to the base 26. The threads 28 are located along the perimeter of the stanchion 42 proximate to the top 44 of the stanchion 42. The plug 19 is rotatively secured to the stanchion 42 via the threads 28. The height at which the plug 19 is placed along the stanchion 42 can be varied.

The top 44 of the stanchion 42 is connected to the first end 48 of the air hose 14. The second end 50 of the air hose 14 is connected to the pump 12. The pump 12 is electrically powered and is connected to the outlet 60, shown in FIG. 1, by an electrical cord 16. The pump 12 is attached to the outside of the outer bucket 18 by the pump bracket 22. However, the pump bracket 22 is for purposes of example only and any support device can be used to support the pump 12 at any location where pump 12 functionality is maintained.

Figure 7:
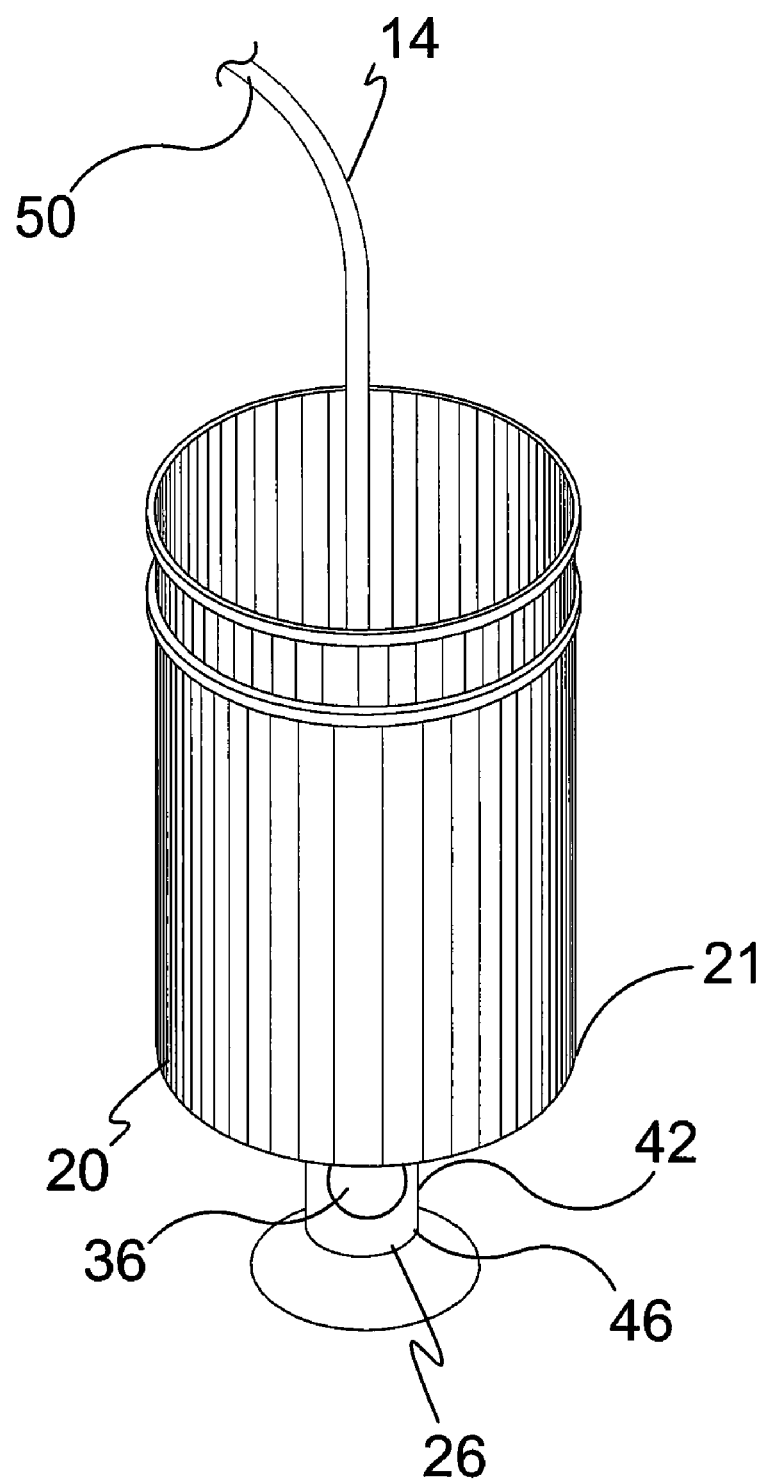
FIG. 7 is a perspective view of the brine tank insert of the present invention.

FIG. 7 is a perspective view of the brine tank insert 10 of the present invention. The brine tank insert 10 includes the outer bucket 18 for retaining fluid therein. The inner cylinder 20 having a central recess is received within the outer bucket 18, shown in FIG. 2. The first end 21 of the inner cylinder 20 receives a plug 19, thereby forming a cavity for retaining brine 32, as shown hereinafter with specific reference to FIG. 14. The brine tank insert 10 also includes the aerator 24 for aerating the fluid in the outer bucket 18. The aerator 24 is comprised of the base 26 and the stanchion 42. The base 26 permits the aerator 24 to be press fitted into the base of the outer bucket 18. The stanchion 42 includes the top 44 and the bottom 46. The bottom 46 of the stanchion 42 is attached to the base 26. The transverse throughbore 36 is located at the bottom 46 of the stanchion 42 proximate to the base 26. The plug 19 is rotatively secured to the stanchion 42 via the threads 28. The height of the plug 19 can be adjusted along the stanchion's 42 length, between the top 44 and bottom 46 thereof.

The top 44 of the stanchion 42 is connected to the first end 48 of the air hose 14. The second end 50 of the air hose 14 is connected to the pump 12. The pump 12 is electrically powered and is connected to the outlet 60, shown in FIG. 1, by an electrical cord 16. The pump 12 is attached to the outside of the outer bucket 18 by the pump bracket 22. However, the pump bracket 22 is for purposes of example only and any support device can be used to support the pump 12 at any location where pump 12 functionality is maintained.

Figure 8:
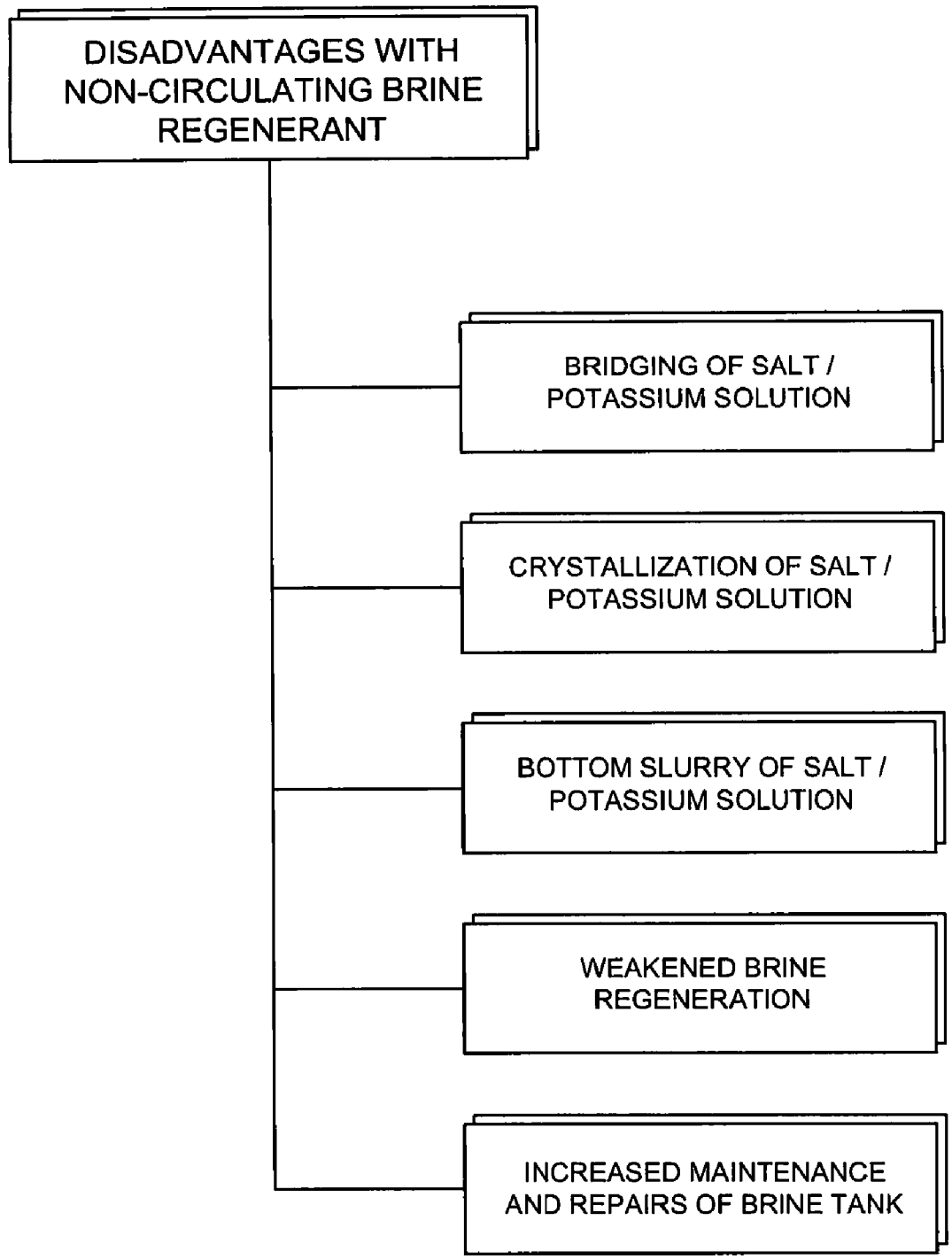
FIG. 8 is a table of disadvantages associated with non-circulating brine regenerant of prior art.

FIG. 8 is a table of the disadvantages of non-circulating brine regenerant of the prior art. In brine regeneration, a brine solution is used to make the water purification systems run more efficiently by removing the hard ions from the resin beads, which remove the hard ions from the water in the first place, thereby allowing the resin beads to continue to remove the hard ions from the water. When brine regenerant is not circulated, problematic conditions such as the bridging of salt/potassium solution and the crystallization of the salt/potassium solution occur. Another problem that occurs when the brine regenerate is not circulated is that a bottom slurry of salt/potassium solution forms. In addition to the above mentioned problems, lack of circulation makes for a weakened and thus less effective brine regeneration. The weak brine regeneration causes increased expenditures in the time and money expended to achieve the proper brine regeneration. The above mentioned problems contribute to increased wear and tear on the brine tanks, thus causing increased maintenance and repair thereof.

Figure 9:
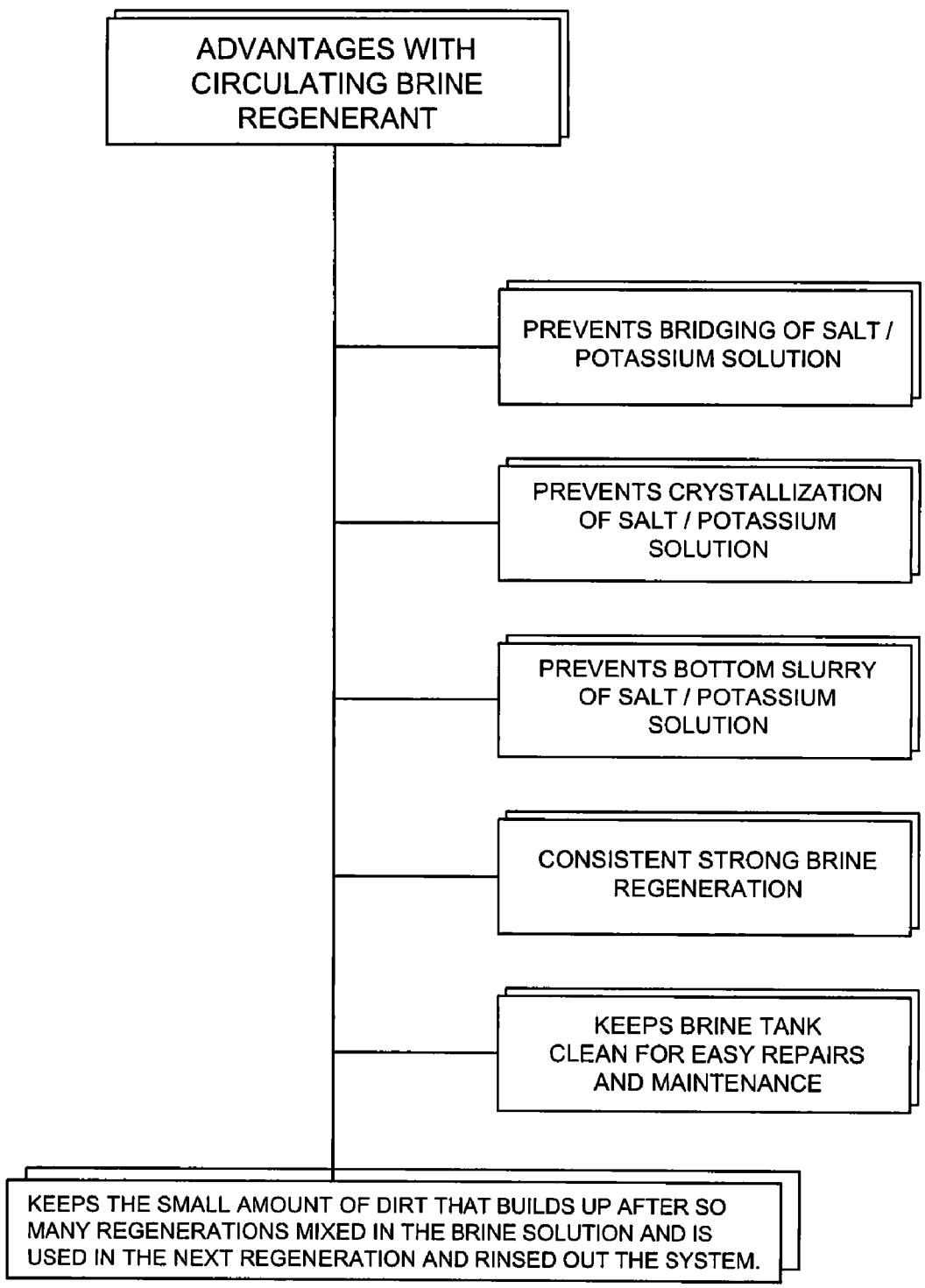
FIG. 9 is a table of advantages of the brine tank insert of the present invention circulating the brine regenerant.

FIG. 9 is a table of the advantages of using a circulating brine regenerant as in the brine tank insert 10 of the present invention. In brine regeneration, a brine solution is used to make the water purification systems run more efficiently by removing the hard ions from the resin beads, which remove the hard ions from the water in the first place, thereby allowing the resin beads to continue to remove the hard ions from the water. Circulation of the brine regenerant prevents both the bridging of and the crystallization of the salt/potassium solution. Circulation of the brine regenerant also prevents a slurry of salt/potassium solution from forming on the bottom of the tanks. A consistent strong brine regeneration is created through the circulation thereof. Prevention of bridging, crystallization and slurry formation keeps the brine tank clean and makes for ease of repairs and maintenance of the brine tank. The circulation of the brine regenerant also keeps the small amount of dirt, which builds up after regernations, mixed in the brine solution. The dirt then gets rinsed out of the system, also facilitating maintenance of the tank.

Figure 10:
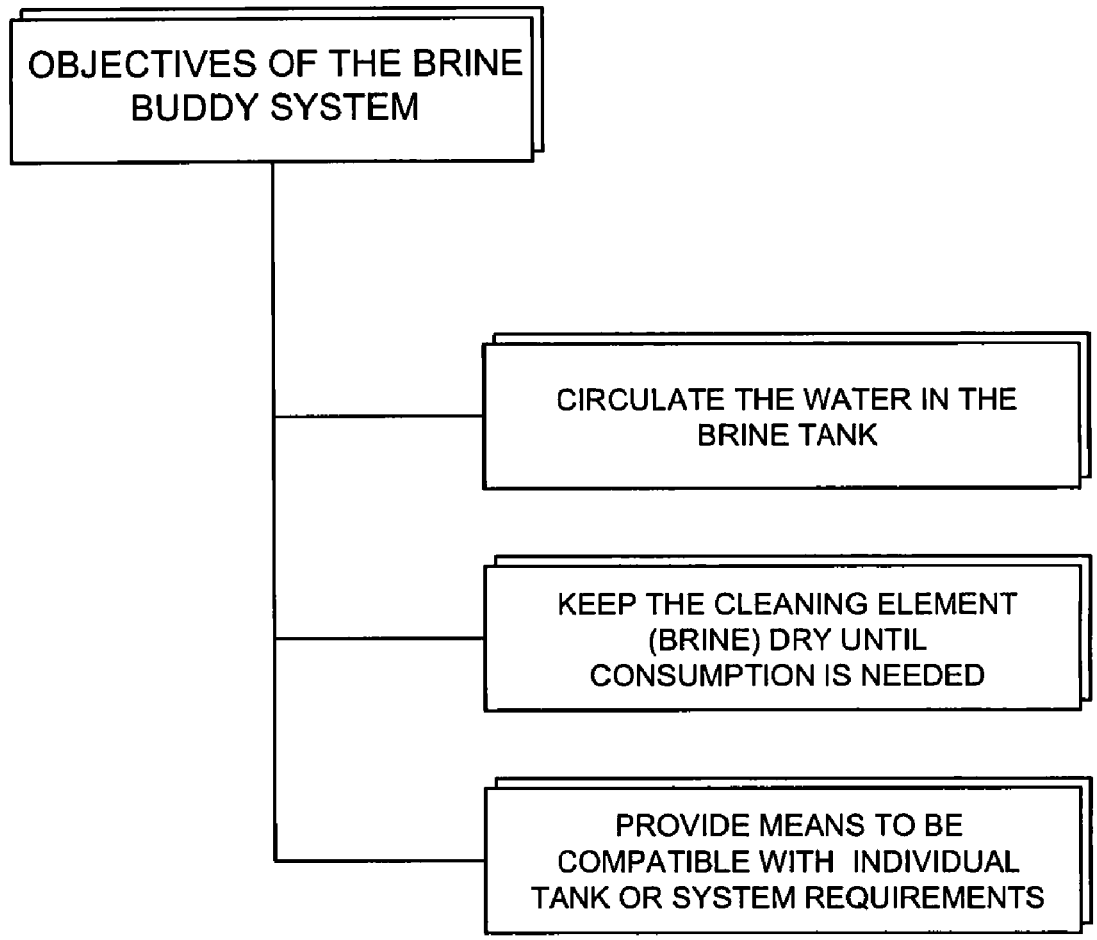
FIG. 10 is a table of the main objectives of the brine tank insert of the present invention.

FIG. 10 is a table of the main objectives of the brine tank insert 10 of the present invention. The main objective of the brine tank insert 10 is to provide cleaner, better tasting water while saving time and money. This objective and others are achieved through the circulation of the brine tank water. The circulation ensures consistent brine saturation into the water, resulting in a strong brine and improved regeneration. The brine tank insert 10 also keeps the brine dry until it is needed, thereby reducing brine consumption and reducing maintenance and repair needs. The brine tank insert 10 is also compatible with existing or new tanks and systems thereby enhancing the consumer's ability to save time and money.

Figure 11:
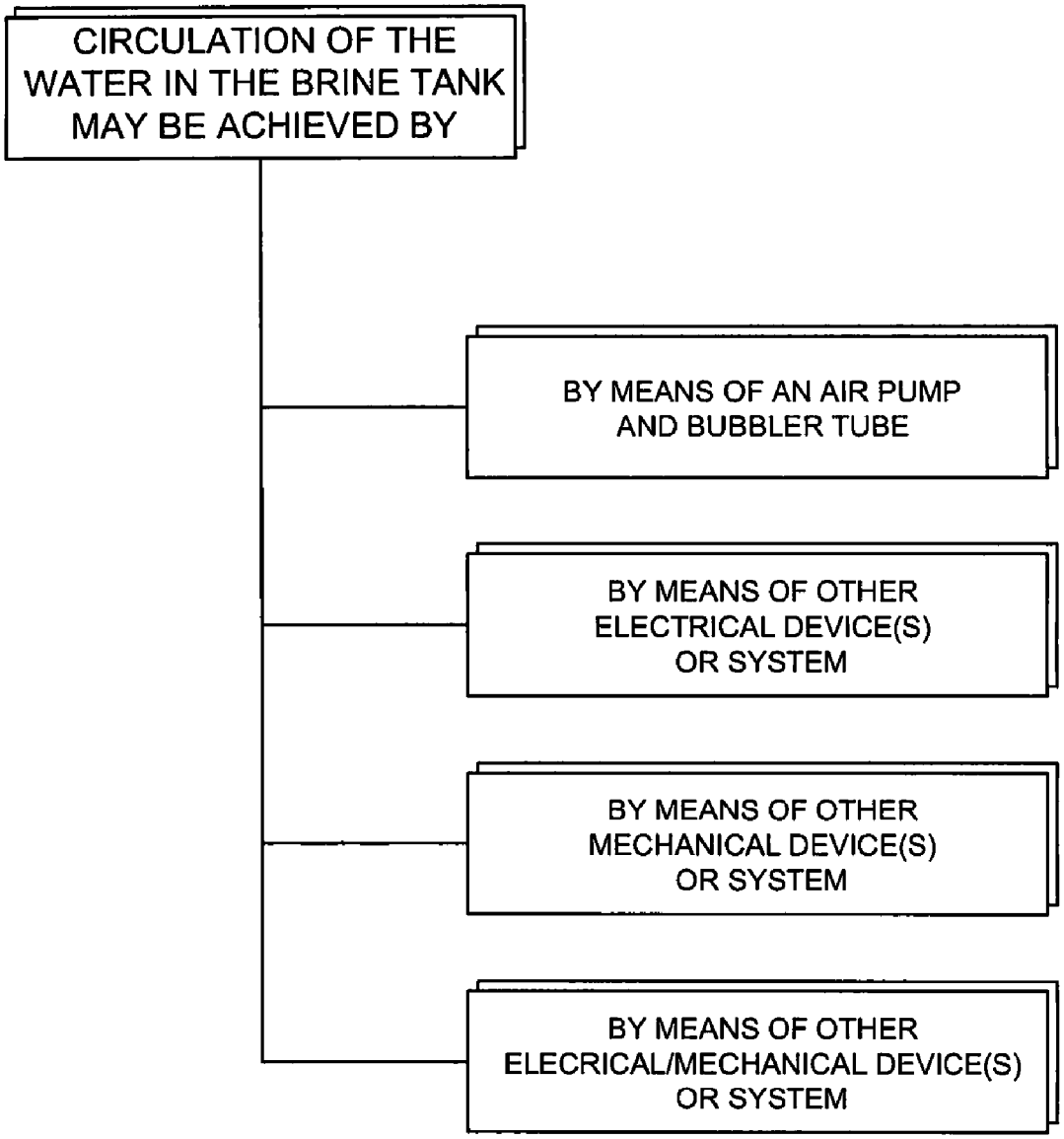
FIG. 11 is a table of means by which the circulation of the water in the brine tank may be achieved.

FIG. 11 is a table of the means by which the circulation of the water in the brine tank may be achieved. A main objective of the brine tank insert 10 of the present invention is to provide circulation of the brine tank water. The circulation ensures consistent brine saturation into the water resulting in a strong brine and improved regeneration. Circulation may be achieved by use of an air pump and bubbler tube. Circulation can also be achieved through the use of other mechanical devices/systems. Alternatively, circulation can be achieved through the use of mechanical devices/systems. Furthermore, circulation can also be achieved through means other than electrical/mechanical devices/systems that may result in improved efficacy and/or cost effectiveness.

Figure 12:
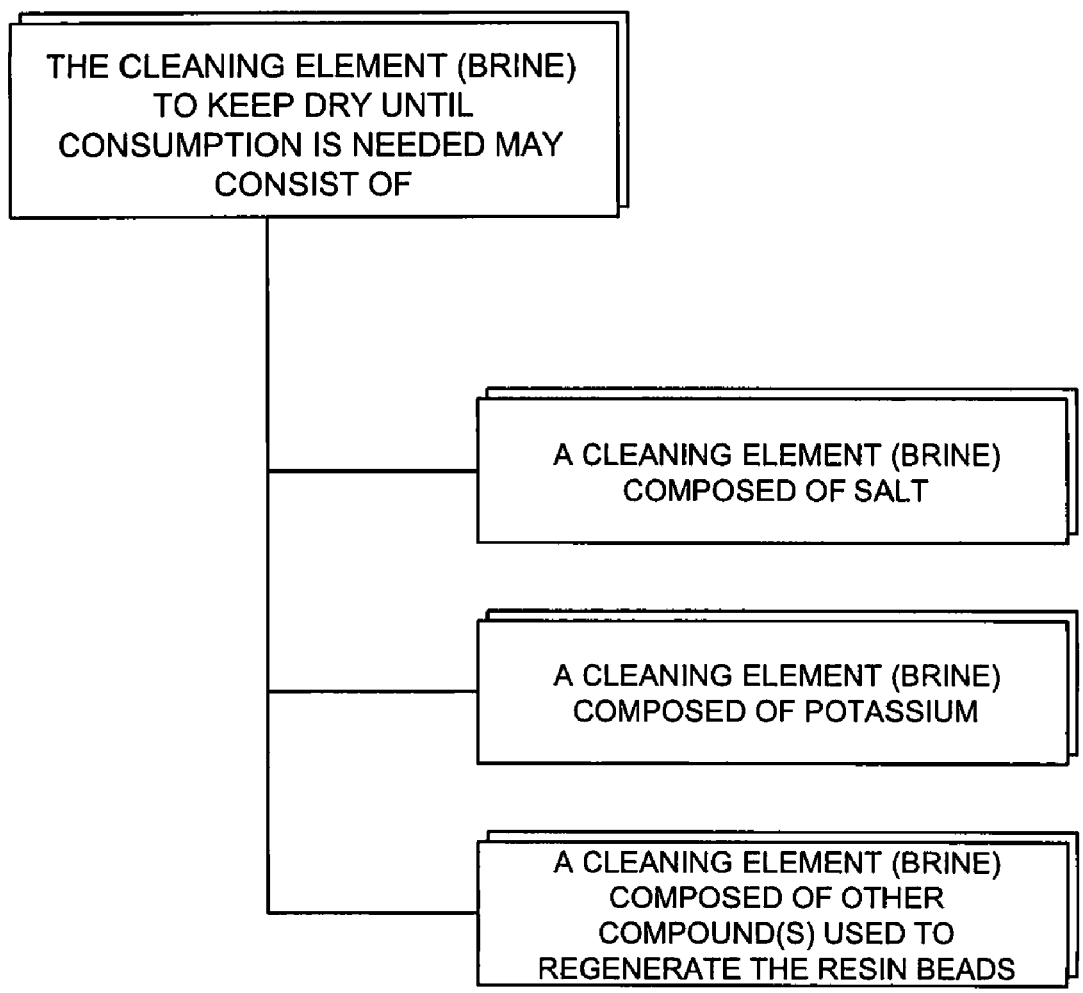
FIG. 12 is a table of different types of cleaning elements (brine) to keep dry until consumption is needed.

FIG. 12 is a table of the different types of cleaning elements (brine). Keeping the cleaning element dry until needed for regeneration reduces brine consumption, improves the handling, and reduces the maintenance and repairs needed. The plastic resin beads are covered with the hard ions from the hard water. The brine solution washes over the beads and exchanges the hard ions for the softer ions in the solution. The hard ions can then be rinsed away, and the beads are once again able to receive the hard ions from the hard water. The brine tank insert 10 of the present invention is suitable with various brine solutions, such as those containing elements such as salt, potassium, and other elements or compounds that are or could be used as a cleaning element.

Figure 13:
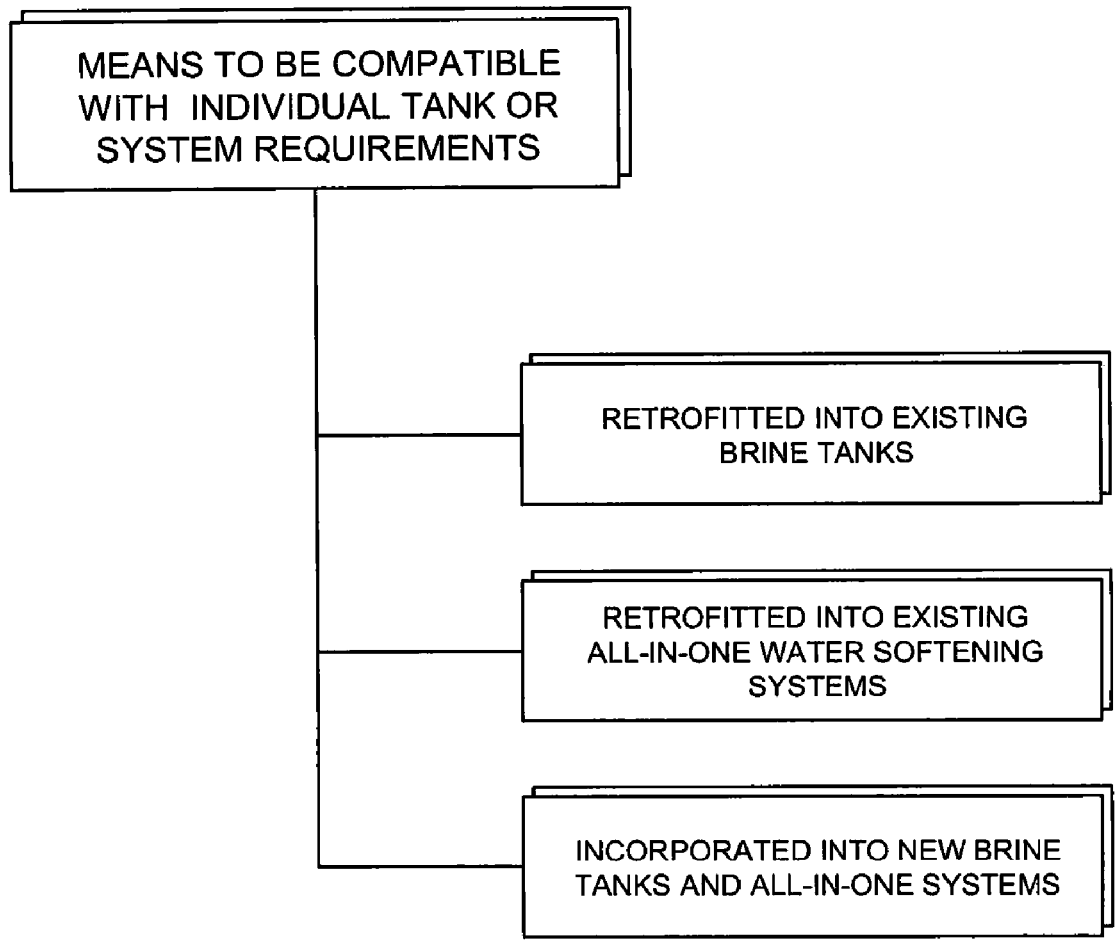
FIG. 13 is a table of the compatibility of the brine tank insert of the present invention with individual tank or system requirements.

FIG. 13 is a table describing the compatibility of the brine tank insert 10 of the present invention. An objective of the brine tank insert 10 is to provide the manufacturer and end user the flexibility to incorporate the brine tank insert 10 to suit their needs. The brine tank insert's 10 ability to adapt to existing or new systems enhances the consumer's ability to save time and money. The brine tank insert 10 can be retrofitted into existing brine tanks, retrofitted into existing all-in-one water softening systems, and incorporated into new brine tanks and all-in-one systems. Also, as discussed hereinabove with specific reference to FIG. 1, the height of the brine tank insert 10 can be adjusted to ensure proper emersion of the cleaning element (brine) into the water.

Figure 14:
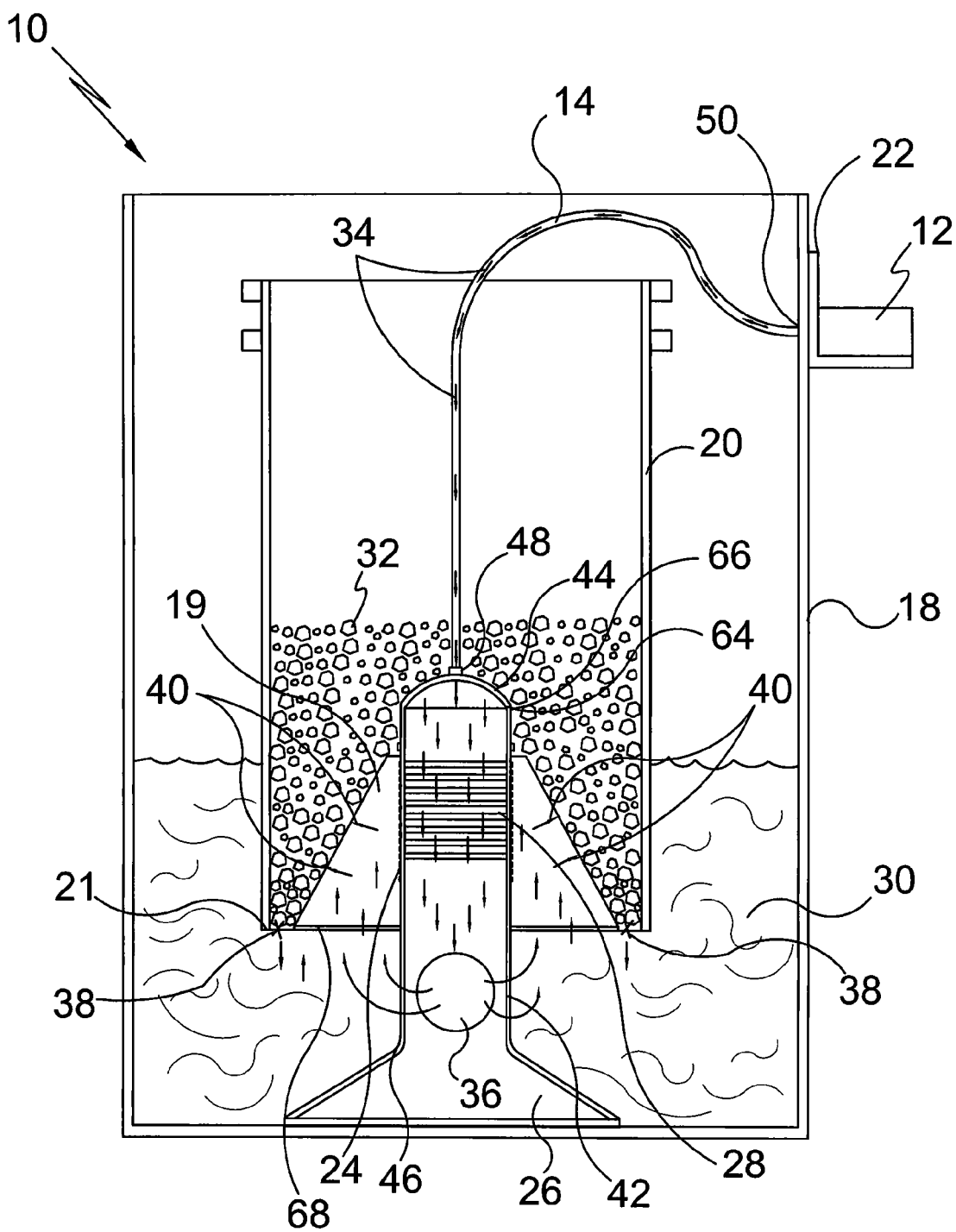
FIG. 14 is an illustrative view of a cross section of the brine tank insert of the present invention.

FIG. 14 is an illustrative view of a cross section of the brine tank insert 10 of the present invention. The brine tank insert 10 includes the outer bucket 18 for retaining fluid therein. The inner cylinder 20 having a central recess is received within the outer bucket 18. The first end 21 of the inner cylinder 20 receives a plug 19, thereby forming a cavity for retaining brine 32. The brine tank insert 10 also includes the aerator 24 for aerating the fluid in the outer bucket 18. The aerator 24 is comprised of the base 26 and the stanchion 42. The base 26 permits the aerator 24 to be press fitted into the bottom of the outer bucket 18. The stanchion 42 includes the top 44 and the bottom 46. The bottom 46 of the stanchion 42 is attached to the base 26. The transverse throughbore 36 is located at the bottom 46 of the stanchion 42 proximate to the base 26. The plurality of threads 28 are located along the perimeter of the stanchion 42 proximate to the top 44 of the stanchion 42. The plug 19 is rotatively secured to the stanchion 42 via the threads 28. Herein, the plug 19 is bell shaped. However, this is for purposes of example only, and the plug 19 can be of any geometric shape that provides for the easy shuffling of the brine 32 and to keep a majority of the brine 32 dry until needed. The plug 19 has the top 66 and the bottom 68. The plug aperture 64 is centrally disposed within the plug 19, and runs from the top 66 to the bottom 68 of the plug 19. The plug aperture 64 contains the plurality of aperture threads 70. Each respective aperture thread 70 corresponds to each respective thread 28 enabling the plug 19 to be rotatively secured to the stanchion 42. The aperture threads 70 and the threads 28 also permit the height at which the plug 19 is placed along the stanchion 42 to be varied. The outer walls of the plug 19 contain the plurality of bell apertures 40 therein for providing air circulation, shown in FIG. 14. A perimeter of the plug 19 has a plurality of base positioned apertures 38 therearound.

The top 44 of the stanchion 42 is connected to the first end 48 of the air hose 14. The second end 50 of the air hose 14 is connected to the pump 12. The pump 12 is electrically powered and is connected to the outlet 60, shown in FIG. 1, by an electrical cord 16. The pump 12 is attached to the outside of the outer bucket 18 by the pump bracket 22. However, the pump bracket 22 is for purposes of example only and any support device can be used to support the pump 12 at any location where pump 12 functionality is maintained.

The outer bucket 18 is filled with water to a desired level. The inner cylinder 20 is filled with brine 32. The plug 19 is adjusted on the stanchion 42 to a desired height and fitted into the inner cylinder 20. The inner cylinder 20, plug 19 and stanchion 42 are placed within the outer bucket 18. The water flows from the outer bucket 18 into the inner cylinder 20 via the plurality of base positioned apertures 38. The water fills the inner cylinder 20 from the base up to the water level in the outer bucket 18, thereby submerging the brine 32 at the base of the outer bucket 18. The pump 12 pumps air through the air hose 14. The air then flows through the stanchion 42 and exits the stanchion 42 through the transverse throughbore 36. The air then agitates the water causing the water to be circulated. Some of the air also flows back into the plug 19 where it flows through the bell apertures 40 for loosening and rinsing the brine 32. The submerged brine 32 will continually dissolve until the saturation and desired brine solution levels are achieved. The brine tank insert 10 also keeps the brine 32 within the inner cylinder 20 and not submerged in the fluid while the submerged brine 32 evenly dissolves.

It will be understood that each of the elements described above, or two or more together may also find a useful application in other types of devices differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An apparatus for with a water softening system, the apparatus comprising:

a. an inner container having at first and second ends and an outer bucket having a closed end and an open end;

b. a plug received within said first end of said inner container for supporting said inner container within said outer bucket and allowing brine to be retained within said inner container;
c. a plurality of apertures extending around a periphery of said plug for providing access between said inner container and the outer bucket;
d. a stanchion having a transverse throughbore extending through a wall thereof and having a base for supporting the stanchion within the outer bucket;
e. said stanchion including a plurality of threads extending around an outer perimeter thereof and said plug including a central aperture having a thread extending around an inner periphery thereof for rotatively connecting said plug to said stanchion; and
f. an agitator positioned within said plug for agitating water retained within the outer bucket, wherein agitating the water in the outer bucket causes the water to flow through said plurality of apertures to contact said brine forming a mixture able to improve the operation of the water softening system.

2. The apparatus as recited in claim 1, wherein said plug is at least one of bell-shaped, and conical; and an end of said plug extends within said inner container.

3. The apparatus as recited in claim 1, wherein said agitator is an aerator for introducing air into the water within said outer bucket.

4. The apparatus as recited in claim 3, wherein said aerator comprises:
a. a pump connected on an external surface of the outer bucket;
b. a tube connected between said pump and said plug, wherein said pump causes air to be provided through said tube and further through said plug for introducing said air into the water within the outer bucket.

5. The apparatus as recited in claim 1, wherein said agitator comprises a pump and a tube connected between said pump and said stanchion for introducing air into the water within the outer bucket via said transverse throughbore in said stanchion.

6. The apparatus as recited in claim 1, wherein said plug further comprises a plurality of apertures extending therethrough for providing additional access to said brine in said inner container.

7. The apparatus as recited in claim 1, wherein said inner cylinder is able to expose only a predetermined amount of brine to the water within the outer bucket thereby not oversaturating the water with said brine.

8. The apparatus as recited in claim 1, wherein a position of said plug along a length of said stanchion is selectively adjustable via said threads.

9. The apparatus as recited in claim 1, wherein said brine retained within said container is at least one of a salt compound and a potassium-based compound.

10. The apparatus as recited in claim 1, wherein upon agitation of the water in outer bucket prevents crystallization of at least one of salt and potassium of said brine mixture.

11. The apparatus as recited in claim 1, wherein upon agitation of the water in the outer bucket prevents formation of a brine slurry.

12. The apparatus as recited in claim 1, wherein said improvement in operation occurs during a regeneration procedure performed by the water softening system.

13. The apparatus as recited in claim 1, wherein upon said mixture being moved over resin beads having hard ions attached thereto, said mixture causes said hard ions to be removed from said resin beads to allow for said beads to continually soft water within the system.

* * * * *